US010457771B2

United States Patent
Delmas et al.

(10) Patent No.: US 10,457,771 B2
(45) Date of Patent: *Oct. 29, 2019

(54) BIOBASED HYDROXYL OR CARBOXYL POLYESTER RESINS

(71) Applicant: Arkema France, Colombes (FR)

(72) Inventors: Gregory A. Delmas, Senlis (FR); Frank Cogordan, Paris (FR); Herve W. Ozeray, Estrees Saint Denis (FR); Alain F. Riondel, Saint Pathus (FR)

(73) Assignee: Arkema France, Colombes (FR)

( * ) Notice: Subject to any disclaimer, the term of this patent is extended or adjusted under 35 U.S.C. 154(b) by 52 days.

This patent is subject to a terminal disclaimer.

(21) Appl. No.: 15/509,497

(22) PCT Filed: Sep. 10, 2015

(86) PCT No.: PCT/FR2015/052407
§ 371 (c)(1),
(2) Date: Mar. 8, 2017

(87) PCT Pub. No.: WO2016/038302
PCT Pub. Date: Mar. 17, 2016

(65) Prior Publication Data
US 2017/0291989 A1 Oct. 12, 2017

(30) Foreign Application Priority Data

Sep. 12, 2014 (FR) ...................... 14 58597

(51) Int. Cl.
*C08G 63/12* (2006.01)
*C08G 63/16* (2006.01)
*C08G 63/66* (2006.01)
*C08G 63/668* (2006.01)
*C08G 63/672* (2006.01)
*C08L 67/02* (2006.01)
*C09D 167/02* (2006.01)

(52) U.S. Cl.
CPC ........... *C08G 63/672* (2013.01); *C08G 63/12* (2013.01); *C08G 63/16* (2013.01); *C08G 63/668* (2013.01); *C08L 67/02* (2013.01); *C09D 167/02* (2013.01)

(58) Field of Classification Search
CPC .... C08G 63/672; C08G 63/668; C08G 63/12; C08G 63/16; C08L 67/02; C09D 167/02; C09J 167/02; C08J 2367/02
See application file for complete search history.

(56) References Cited

U.S. PATENT DOCUMENTS

| 3,391,083 | A  | * | 7/1968 | Irani | .................. | C11D 1/78 |
|           |    |   |        |       |                    | 510/108 |
| 8,163,459 | B2 | * | 4/2012 | Farrugia | ............... | C08G 63/672 |
|           |    |   |        |       |                    | 430/137.14 |
| 9,969,840 | B2 | * | 5/2018 | Cogordan | ............ | C08G 63/668 |
| 2002/0115817 | A1 |  | 8/2002 | Hayes | | |
| 2005/0244312 | A1 | * | 11/2005 | Suppes | ................. | C07C 29/145 |
|           |    |   |        |       |                    | 422/198 |
| 2008/0091039 | A1 | * | 4/2008 | Sleeter | .................... | C07C 51/36 |
|           |    |   |        |       |                    | 554/145 |
| 2009/0018300 | A1 | * | 1/2009 | Bloom | ................... | C08G 61/12 |
|           |    |   |        |       |                    | 527/102 |
| 2010/0276059 | A1 | * | 11/2010 | Tian | .......................... | C08F 2/48 |
|           |    |   |        |       |                    | 156/71 |
| 2012/0220676 | A1 |  | 8/2012 | Moens | | |
| 2013/0197152 | A1 |  | 8/2013 | Herve et al. | | |
| 2014/0371419 | A1 |  | 12/2014 | Farrugia et al. | | |
| 2015/0031828 | A1 |  | 1/2015 | Roussel et al. | | |
| 2016/0168318 | A1 | * | 6/2016 | Barquant | ............... | C08G 63/48 |
|           |    |   |        |       |                    | 549/464 |

FOREIGN PATENT DOCUMENTS

GB  1012563 A * 12/1965 ............. C08G 63/58
WO  WO-2012005645 A1 * 1/2012 ............. C08G 63/20

OTHER PUBLICATIONS

Bart A. J. Noordover., et al—Bio Macromiecules, ACS Publications "Co- and Terpolyesters Based on Isosorbide and Succinic Acid for Coating Applications: Synthesis and Characterization" Biomacromolecules; 2006, 7 (12), pp. 3406-3416—DOI 10.1021/bm060713v.

* cited by examiner

*Primary Examiner* — Kregg T Brooks
(74) *Attorney, Agent, or Firm* — Lynn B. Morreale

(57) ABSTRACT

The present invention relates to a linear or branched structured hydroxylated or carboxylated polyester resin that is free of unsaturated fatty acids, that is made from an acid component and an alcohol component, said acid component comprising at least one C4 to C6 carboxylic polyacid or anhydride, and at least one C5 to C54 carboxylic polyacid or anhydride, and with said alcohol component comprising at least one biobased polyol having a functionality of at least 2 bearing a 1,4:3,6-dianhydrohexitol unit, and at least one of two polyols b2) and b3).

18 Claims, No Drawings

BIOBASED HYDROXYL OR CARBOXYL POLYESTER RESINS

CROSS-REFERENCE TO RELATED APPLICATIONS

This application is a national stage application under 35 U.S.C. § 371 of PCT/FR2015/052407, filed Sep. 10, 2015 which claims benefit to application FR14.58597, filed Sep. 12, 2014.

The invention relates to a polyester resin having a linear or branched structure and free of unsaturated fatty acids, which is hydroxylated or carboxylated based on renewable raw materials, in particular at least based on a specific biobased polyol, to a coating composition comprising said resin and to the use thereof in coatings having a high durability and based on renewable raw materials, in particular for metal sheet coatings.

Oil-free functionalized polyester resins are well known for coating applications for metal sheets known as coils.

Polyol polyester resins based on components of renewable origin, also known as "biobased", for application in metal sheet coatings are already described in WO 2012/042153 and in particular oil-free resins. These polyester resins are based on rosin. However, as such, they need improvement in terms of durability and resistance to yellowing.

B. A. Noordover et ale describe, in J. Biomacromolecules, 2006, 7, 3406-3416, co- and terpolyesters based on isosorbide and succinic acid and other monomers of renewable origin, such as 2,3-butanediol or 1,3-propanediol or citric acid.

No presence of polyacids having an at least $C_8$ longer chain is mentioned or suggested.

The present invention seeks to develop novel hydroxylated or carboxylated polyester resins, which are oil-free and free of any unsaturated fatty acid residue, having an improved durability and resistance to yellowing and an improved hardness/flexibility compromise regarding the coating obtained, in particular for application to metal sheets.

The first subject of the present invention relates to said linear or branched polyester resin which is hydroxylated and/or carboxylated, based on a specific composition with renewable raw materials and in particular based on a specific biobased polyol.

Also covered is the solution of said resin in an organic solvent.

Another subject of the invention relates to a coating composition comprising said resin and in particular a cross-linkable coating composition.

Also part of the invention is the use of said resin in said coating compositions and, finally, the coating which results therefrom.

Thus, the first subject of the invention relates to a polyester resin having a linear or branched structure and free of unsaturated fatty acids, which is hydroxylated or carboxylated, which resin is based on:
  an acid compound a) comprising:
    a1) at least one $C_4$ to $C_6$ polycarboxylic acid or anhydride, preferably having a functionality $f_{a1}$ ranging from 2 to 4, more preferentially equal to 2,
    a2) at least one $C_8$ to $C_{54}$ polycarboxylic acid or anhydride, preferably having a functionality $f_{a2}$ ranging from 2 to 4, more preferentially equal to 2,
    a3) optionally, at least one $C_2$ to $C_{22}$ saturated monoacid, which can optionally bear a hydroxyl group,
  an alcohol component b) comprising:
    b1) at least one biobased polyol having a functionality $f_{b1}$ of at least 2, preferably 2, bearing a 1,4:3,6-dianhydrohexitol unit,
  and at least one of the following two polyols b2) and b3):
    b2) at least one polyol different than b1) and having a functionality $f_{b2}$ of at least 2, preferably 2, more particularly a $C_3$ to $C_{36}$ polyol,
    b3) at least one polyol different than b1) and than b2) having a functionality $f_{b3}$ of at least 3, preferably 3.

According to one particular option, the two polyols b2) and b3) may be present.

The term "resin free of unsaturated fatty acids" means, according to the present invention, the absence of any unsaturated fatty acid or of unsaturated fatty acid oil in a form chemically incorporated into the structure of said resin or in free form (not chemically incorporated).

Said polyacid a1) includes in its coverage acids such as aconitic acid derived from sugar cane, of $C_6$ and having a functionality $f_{a1}=3$. The polyacid a1) may also bear a group among hydroxyl, such as citric acid with $f_{a1}=3$ and additionally bearing a hydroxyl or malic function with $f_{a1}=2$, and bearing a hydroxyl or glutamic acid with $f_{a1}=2$ and bearing an amine group.

More particularly, said unit borne by said polyol b1) is isosorbide (1,4:3,6-dianhydro-D-sorbitol), isomannide (1,4:3,6-dianhydro-D-mannitol) or isoidide (1,4:3,6-dianhydro-L-iditol).

According to one particular preference, a fraction of at least 50%, preferably of at least 75%, by weight of said resin is biobased.

A biobased resin or product means that it comprises a raw material of non-fossil origin which is renewable and of plant or animal origin.

The "biobased" characteristic of a product or resin or of a raw material used as component of said product, such as a polyacid, a polyol or a fatty acid, can be determined by determining the $^{14}C$ carbon content, which attests to the renewable origin of the carbon of said component as such or incorporated into a final product after reaction (which in no way modifies this content). This is because a biobased component is a component in which the carbon originates from carbon dioxide ($CO_2$) fixed by photosynthesis from Earth's atmosphere. The specific fixed content of $^{14}C$ carbon is the signature of a biobased component which differs from that corresponding to a component of fossil origin. This content can be determined according to ASTM D 6866 (ASTM D 6866-06) or ASTM D 7026 (ASTM D 7026-04), in particular by mass spectrometry according to ASTM D6866-06.

According to one particular case, said component b) comprises b2) and b3) and at least 50% by weight, preferably at least 75% by weight, of said component b) is biobased.

More particularly, the components a) and b) may be 100% biobased.

According to another particular option, said polyol b2) is biobased and is chosen from 1,3-propylenediol or 1,2-propylenediol, 1,4-butanediol or diols based on (meaning derived from) saturated fatty acids. Such diols may have a $C_{12}$ to $C_{36}$ chain.

Even more particularly, said polyol b3) may be biobased and chosen from glycerol and ether-polyol derivatives thereof, such as polyglycerols (oligomer derivatives of glycerol).

In the case where the functionality of one of the components mentioned is greater than 2, preferably the number-average functionality of the mixture of the components a)+b) does not exceed 2. Said polyester thus has a linear or branched structure and, by definition, it cannot comprise a crosslinked structure, which is thus by definition excluded. Those skilled in the art know in particular how to choose the proportions and the functionalities of reactive components and also the degree of conversion of the reactive functions, in order to avoid any chemical gelling or crosslinking of the reactive system. This question can only arise when one of the reactive components (a) and (b) has an average functionality greater than 2 in order to obtain a branched structure. It is possible to control the structure without any possible crosslinking, by adjusting the proportions of the components a) and b) such that the number-average functionality (per mole of reactant component) over the whole of the reactive components (a+b) does not exceed 2 or, if it exceeds 2, to limit the degree of conversion well before the gel point (gelling) that is predictable either by experimentation or by calculation according to the Macosko-Miller relationship and/or by progressive addition of the least functionalized component to the most functionalized component with efficient stirring (reactive functions maintained in excess by the progressive addition of the second reactive component). The Macosko-Miller relationship mentioned above is as defined according to Macromolecules, vol. 9, pages 199-211 (1976) and is considered to be well known to those skilled in the art. For greater clarity, this relationship is recalled below, said relationship linking the critical ratio $r_c$ of the reactive functions for two reactive components A and B to the gel point, $r_c$=A functions/B functions, with the average functionality of A being $f_A$, and that of B being $f_B$ with the critical degree of conversion at the gelling point $x_g$ below:

$$r_c * x_g^2 = 1/[(f_B-1)*(f_A-1)]$$

Said polyacid a1) may in particular be a biobased aliphatic diacid chosen from: succinic acid, tartaric acid, citric acid, malic acid or itaconic acid, glutaric acid, glutamic acid, fumaric acid, furan dicarboxylic acid, tetrahydrofuran-2,5-dicarboxylic acid and tetrahydrofuran-3,5-dicarboxylic acid and preferably from: succinic acid, itaconic acid, glutamic acid, fumaric acid, furandicarboxylic acid, tetrahydrofuran-2,5-dicarboxylic acid and tetrahydrofuran-3,5-dicarboxylic acid.

Said polyacid a2) may also be biobased and chosen from: azelaic acid ($C_9$), sebacic acid ($C_{10}$), undecanedioic acid, dodecanedioic acid or respectively $C_{36}$ and $C_{54}$ fatty acid dimers and trimers. The presence of this diacid a2) and the proportion thereof relative to a1) are important factors for adjusting the hardness/flexibility compromise of the final coating and adjusting the hardness/flexibility ratio, an increase in the content of a2) improves the flexibility. Conversely, the hardness of the coating increases as the content of a1) increases.

Preferably, the a1)/a2) molar ratio ranges from 2 to 8 and more preferentially from 3 to 7.

According to one particular mode, said monoacid a3) is present in the composition of said resin and selected from: acetic acid, pyruvic acid, lactic acid or rosin (abietic acid and $C_{20}$ isomers) or a $C_{12}$ to $C_{22}$ saturated fatty acid.

According to one particular and preferred mode of said resin, said polyol b1) represents at least 30% by weight of said resin, this weight of "said resin" meaning herein "relative to the total weight of the components a)+b) used for said resin".

More particularly, the content of the polyol b1) in mol/mol % relative to the whole of the alcohol component b) ranges from 40 to 80 and preferably from 55 to 65.

The content corresponding to the polyol b2) can range from 0 to 50 and preferably from 25 to 35.

The molar content of the polyol b3) can range from 0 to 20 and preferably from 5 to 15.

Regarding the OH or carboxy functionality, optionally OH and carboxy functionality of said resin, it may correspond to an OH and/or acid number ranging from 10 to 200 mg KOH/g.

More particularly, said resin may have a carboxy functionality corresponding to an acid number of less than 20, preferably less than 10 and more preferentially less than 5 and in particular 0 mg KOH/g and an OH functionality corresponding to an OH number ranging from 10 to 200, preferably from 10 to 150, more preferentially from 10 to 100 mg KOH/g. The OH number is determined according to ISO 2554. The acid number is determined according to ISO 2114.

The resin according to the invention may thus be OH-functionalized or carboxy-functionalized or OH- and carboxy-functionalized, preferably in the latter case with a predominant OH functionality, that is to say with more than 90% of functional groups being OH.

Regarding the number-average molecular weight Mn of said resin, it may range from 500 to 20 000 and preferably from 750 to 10 000. This molecular weight Mn is determined by calculation from the functionality number (in mg KOH/g) and from the average functionality $f_r$ of said resin which represents the average number of OH and/or carboxy acid functions, calculated from the material balance (molar proportions) and from the known functionality of the components a) and b) used.

The Tg of said resin can range from −10° C. to 100° C. and preferably from 10 to 50° C. Said Tg is determined by DSC measurement at the 2nd passage at 10° C./min.

The second subject of the invention relates to a solution of resin in an organic solvent, which solution comprises at least one resin as defined above according to the invention. More particularly, said solvent may be selected from the methyl esters or ethyl esters of $C_2$ to $C_4$ monocarboxylic acids or esters of said monocarboxylic acids with methoxy or ethoxy monoethers of $C_2$ to $C_4$ diols, in particular methoxypropyl acetate, or from methyl or ethyl diesters of $C_4$ to $C_6$ dicarboxylic acids, terpenes, polyhydroxyalkanoates, methyl or ethyl esters of fatty acid oils or esters of lactic acid with $C_1$ to $C_8$ alcohols.

The resin of the invention can be prepared by reaction between the acid a) and alcohol b) components as defined above and according to the following successive steps:
  i) reaction of all of the acid component a) with said component b1) of said alcohol component b) until a conversion of at least 85%, preferably 100% of said component b1) is obtained, followed by
  ii) reaction of the product resulting from step i) with the rest of said alcohol component b), comprising at least one of the polyols b2) or b3) as defined above, the reactions of said steps i) and ii) taking place in solution in at least one organic solvent which can form an azeotrope with water.

The carboxy/OH ratio in the first step i) can range from 1.1 to 2.1, preferably from 1.2 to 2.

The functionality of said resin is regulated by the nature of the component a) or b) which is in overall stoichiometric excess.

A third subject of the invention relates to a coating composition, preferably a coating composition in an organic solvent medium, said composition comprising at least one resin as defined above according to the invention or (comprising) a resin solution as defined above. Preferably, said composition is a crosslinkable composition comprising, in addition to said resin, at least one crosslinking agent, bearing groups which are reactive with the hydroxyl and/or carboxyl groups borne by said resin.

When said resin is hydroxylated, said crosslinking agent can be selected from: melamine or a polyisocyanate, in particular a blocked polyisocyanate, or a polyanhydride or a polysilane, in particular an alkoxy-blocked polysilane, and when said resin is carboxylated, said crosslinking agent can be selected from polyepoxides or polyols.

As crosslinking agent polyols which are suitable when said resin is carboxylated, mention may be made of any monomeric or oligomeric polyols having an aliphatic or cycloaliphatic structure. As examples of aliphatic monomeric polyols, mention may be made of trimethylolpropane or glycerol or pentaerythritol or ditrimethylolpropane or dipentaerythritol, it being possible for these polyols to be optionally alkoxylated. Other polyols which may be suitable are acrylic polyol, polyether polyol or polyester polyol oligomers. Polyester polyol oligomers which are suitable as crosslinking agents when said resin is carboxylated are also the hydroxylated polyester resins as defined according to the present invention.

More particularly, said coating composition is entirely biobased with said resin and said crosslinking agent both being biobased, preferably 100% biobased.

In the possible case where the resin bears both hydroxyl and carboxy functions, a mixture of crosslinking agents corresponding respectively to each functionality of said resin can be used, optionally with two addition steps for avoiding the possible coreaction between the two crosslinking agents.

Preferably, the OH or carboxy functionality is predominant or the only one and said crosslinking agent is specific for the OH functionality only or specific for the carboxy functionality only.

According to one particularly preferred option, said composition is a coating composition in an organic solvent medium and in particular a paint or varnish composition, more particularly for metal surfaces. More preferentially, said metal surfaces are in the form of metal sheets (coils).

Another subject of the invention relates to the use of a resin as defined above or (the use) of a solution of such a resin in coating compositions, in particular in crosslinkable coating compositions. Such a use relates in particular to coating compositions with a "single component" behavior for metal and in particular for a metal sheet coating. A composition with a "single component" behavior is characterized by the fact that it is storage-stable and that it is crosslinkable only by heat activation, said characteristic being essential for this purpose.

According to one particular option, said use relates to a primer coat, a finish, a backing coat or a monolayer coat. The term "backing coat" means herein a coat applied to the "back" or "hidden" face of the metal sheet (strip).

Another potential use of said resin relates to powder coatings, which are in particular crosslinkable. Said resin may be carboxylated and the crosslinking agent may be a polyepoxide or a polyol based on cyanurate, in particular trihydroxyethyl cyanurate.

According to another option, said use relates to "two-component" coatings. Said two-component coating compositions are crosslinkable at low temperature and do not require heat activation. In fact, in this case, said resin in the presence of said crosslinking agent reacts as soon as it is mixed with said agent. Consequently, such a composition is prepared just before use and is thus not storage-stable, resulting, after mixing and reaction of said resin with said crosslinking agent, in an irreversibly crosslinked structure.

Finally, the invention relates to a finished product, in particular a coating, which results from the use of at least one resin as defined above or of a solution of such resin or of a coating composition as defined above according to the present invention.

The following examples are presented by way of illustration of the invention and of the performance levels thereof and do not in any way limit the scope thereof.

EXPERIMENTAL SECTION

1) Raw Materials Used

TABLE 1 raw materials used

| Trade name | Chemical name | Supplier | Technical function | Nature function and functionality | Component of type according to invention |
|---|---|---|---|---|---|
| Polysorb ® P | Isosorbide | Roquette | Diol* | OH/2 | b1) |
| Oleris ® Sebacic acid | Sebacic acid | Arkema | Diacid* | Carboxy/2 | a2) |
| Bio SA | Succinic acid | Bio Amber | Diacid* | Carboxy/2 | a1) |
| Glycerine ® 4813 | Glycerol | Oleon | Triol* | OH/3 | b3) |
| Fascat ® 4100 | Butylstannoic acid | PMC Organo Metallix | Catalyst | — | Catalyst |
| MIBK | Methyl isobutyl ketone | Arkema | Azeo solvent | — | Azeo solvent |

TABLE 1-continued raw materials used

| Trade name | Chemical name | Supplier | Technical function | Nature function and functionality | Component of type according to invention |
|---|---|---|---|---|---|
| MPA | Methoxypropyl acetate | BASF | Resin solvent | — | Resin solvent |
| Dibasic Ester (DBE) | Mixture of esters** | Invista | Resin solvent | | Resin solvent |

*biobased
**mixture of methyl esters of adipic, glutaric and succinic acid

2) Preparation of the Resin (Procedure Example 1 according to the Invention)

An electrically heated 3-liter reactor, equipped:
with a distillation column of the Vigreux type surmounted by a Dean-Stark separator, with a
dip tube for introducing nitrogen,
with a temperature probe,
is charged with:
582 g of isosorbide,
246.8 g of sebacic acid,
380.9 g of succinic acid,
0.13 g of Fascat® 4100 (butylstannoic acid).

Under a nitrogen flow, the mixture is heated to 150° C. and 50.62 g of methyl isobutyl ketone (MIBK) are introduced as azeotropic entrainer (solvent). Heating is then carried out to 220° C. while at the same time removing the reaction water in the form of a heteroazeotrope with the MIBK until a constant acid number of 165 mg KOH/g is obtained, corresponding to a degree of conversion of the isosorbide of 99.5%. The duration of this first step is 8 h. Cooling to 180° C. is carried out and 55.7 g of glycerol are introduced into the reactor. The reaction medium is brought to 220° C. still under nitrogen, until an acid number <10 mg KOH/g is obtained. The reactor is cooled to 150° C. and 617.57 g of methoxypropyl acetate (MPA) are added as solvent for diluting the resin. At 90° C., the reactor is emptied and the dry extract is adjusted by adding 68.62 g of MPA.

The final characteristics of the product are:
Coloration: 3 Gardner (ISO method 4630)
Dry extract: 60% (ISO method 3251)
Brookfield viscosity at 25° C. (ISO method 3219): 4350 mPa·s
Acid number: 8 mg KOH/g (ISO method 2114)
OH number (essential functionality) (mg KOH/g): 70 (ISO method 2554).
Isosorbide measured by carbon 13 NMR analysis: 0.1% in the solvented resin, which corresponds to a final degree of conversion of the isosorbide of 99.7%.

Comparative Example 2

Example 1 is reproduced, but this time without sebacic acid.

During this test, the final polyester obtained is insoluble in PMA and it is necessary to add dibasic ester supplied by Invista, which is a mixture of methyl esters derived from adipic acid, from succinic acid and from glutaric acid, having a respective composition by weight (weight percentage):
dimethyl ester of adipic acid: 0.1-22%,
dimethyl ester of succinic acid: 0.1-98%
dimethyl ester of glutaric acid: 0.3-99%.

The final characteristics of the product are:
Coloration: 3 Gardner (ISO method 4630)
Dry extract: 48% (ISO method 3251) for an MPA/DBE ratio of 67/33
Brookfield viscosity at 25° C. (ISO method 3219): 800 mPa·s
Acid number: 8 mg KOH/g (ISO method 2114)
OH number (essential functionality) (mg KOH/g): 70.
Isosorbide measured by carbon 13 NMR analysis: 0.09% in the solvented resin, which corresponds to a final degree of conversion of the isosorbide of 99.5%.

3) Application of the Resins in Satin Paints for Metal Sheet
3.1) Satin Paint Formulation

TABLE 2

Compositions and raw materials used

| Component | Parts by weight out of 1000 | Component ref. | Function | Chemical name | Supplier |
|---|---|---|---|---|---|
| Resin example 1 (part 1) | 209 | (1) | Binder | Hydroxylated resin according to the invention | — |
| PMA (part 1) | 25.5 | (2) | Solvent | Methoxypropyl acetate | BASF |
| Disperbyk ®-161 | 5.5 | (3) | Dispersant | Block copolymer | BYK |
| TiO$_2$-Kronos 2360 | 243 | (4) | Pigment | Titanium oxide | Kronos |
| Silice Aerosil ® R972 | 2.5 | (5) | Rheological additive | Silica | Evonik |

TABLE 2-continued

Compositions and raw materials used

| Component | Parts by weight out of 1000 | Component ref. | Function | Chemical name | Supplier |
|---|---|---|---|---|---|
| Resin example 1 (part 2) | 220 | (1) | Binder | Hydroxylated resin according to invention | — |
| PPA (part 2) | 31 | (2) | Solvent | Methoxypropyl acetate | BASF |
| Silice Syloid ® ED 40 | 30 | (6) | Matting agent | Silica | Grace |
| Cymel ® 303 LF | 46 | (7) | Crosslinking agent | Methylated melamine | Allnex |
| PTSA catalyst | 7.5 | (8) | Catalyst | p-Toluenesulfonic acid (12.5% in butanol) | Aldrich |
| PMA (part 3) | 154 | (2) | Solvent | Methoxypropyl acetate | BASF |
| Solvarex ® 9 | 24 | (9) | Solvent | Aromatic hydrocarbon | Total |
| Crayvallac ® Flow 200 | 2 | (10) | Spreading agent | Polyester | Arkema |
| Total | 1000 | | | | |

3.2) Procedure for Preparing the Satin Paints

The following compounds (1) (part 1), (2) (part 1), (3), (4) and (5) are introduced, in the order indicated, into a thermostated 1-liter beaker at ambient temperature. This mixture is stirred using a stirrer of Dispermat type, then dispersed for 30 minutes at 3500 rpm. The rest (part 2) of the binder (1), the rest (part 2) of the solvent (2) and the compound (6) are then added. The dispersion is continued for 15 minutes at 2500 rpm. Still with stirring at 1000 rpm, the compounds (7) and (8) are added. The viscosity of the paint is adjusted by means of the addition of (2) (part 3) and (9). Finally, the compound (10) is added, still with stirring at 1000 rpm.

The characteristics of the satin paint obtained are given in table 3 below.

TABLE 3

Characteristics of the satin paint

| Characteristics | Measurement method | Example 1 according to the invention | Comparative example 2 |
|---|---|---|---|
| Density (g/cm³) | NF EN ISO 2811-1 | 1.27 | 1.32 |
| Solid by weight (%) Dry extract (DE) | ISO 3251 | 58.3 | 57.5 |
| Solid by volume (%) | Dry volume/total volume ratio | 44.2 | 44.7 |
| VOC (g/l)* | Calculation grams solvent per liter of paint | 530 | 558 |
| PVC (%)** | Calculation volume pigments/volume pigments + volume binder ratio (calculated on solids) | 22.8 | 22.7 |
| Cone/plate viscosity at 25° C. (m · Pas) | ISO 2884-1 | 520 | 520 |

*VOC: Volatile Organic Compounds
**PVC: Pigment Volume Concentration

3.3) Metal Sheet used, Conditions for Applying the Satin Paint and Conditioning before Evaluation Tests The sheet metal used for the tests is a galvanized steel sheet 0.5 millimeter in thickness, pretreated with a solution of chromate.

The paint is applied by means of an applicator of Bar Coater type. Two types of application are carried out:
top coat
direct-to-metal coat.

The thickness of the top coat and of the direct-to-metal coat is 20 μm.

In the case of the top coat, the paint is applied to a sheet metal already coated with a compatible primer coat 5 μm thick. The total thickness of the coating is 25 μm, including the primer coat (top coat of 20 μm).

The sheet metal thus coated is introduced into a furnace at 385° C. The crosslinking with melamine is carried out at a peak metal temperature (called PMT) of 232° C. for 35 seconds.

The paint, as direct-to-metal coat applied on a primer as top coat, is then evaluated according to various performance tests, after conditioning of the test panels (painted sheet metal) in a room air-conditioned at 23° C.±2 with the humidity controlled at 50%±5%.

4) Tests for Evaluating the Performance Levels of the Paints

TABLE 4

Tests used

| Tests | Description or referral to normative method reference |
|---|---|
| Cupping test (mm) | NF EN ISO 1520 |
| Adhesion test (score of 0 = good to 5 = poor) | NF EN ISO 2409 |
| Gloss at 60° (GU) | NF EN ISO 2813 |
| T-bend test (score of 0.5 T up to final value with a step of 0.5 unit at each bend up to final absence of degradation of the coating: the lower the value of T, the better the result) | NF EN 13523-7 |
| Persoz hardness (s) | NF EN ISO 1522 |

5) Results and Conclusion
5.1) Direct-to-Metal Coat (DTM Application)

TABLE 5

Results obtained with direct-to-metal coat

|  | Example 1 according to the invention | Comparative example 2 |
|---|---|---|
| Cupping test (mm) | 4.5 | 2.8 |
| Adhesion test | 0 | between 0 and 1 |
| Bend test | 5 T | >6 T |
| Persoz hardness (s) | 207 | 233 |

5.2) To Coat on Primer

TABLE 6

Results obtained with top coat

|  | Example 1 according to the invention | Comparative example 2 |
|---|---|---|
| Cupping test (mm) | 6.2 | 5.8 |
| Adhesion test | 0 | 0 |
| Gloss at 60° (GU) | 28 | 15 |
| Bend test | 3.5 T | 5 T |
| Persoz hardness (s) | 220 | 230 |

The polyol polyester based on raw materials of biobased origin, which is the subject of the invention, makes it possible to prepare coatings for a metal sheet having advantageous applicative properties with in particular a good compromise between hardness and bend test.

Example 1, according to the invention, carried out with sebacic acid results in a paint that is much more flexible (result of the bend test) with a very satisfactory level of hardness for the intended application.

The invention claimed is:
1. A polyester resin having a linear or branched structure and free of unsaturated fatty acids, which is hydroxylated or carboxylated, optionally hydroxylated and carboxylated, which is derived from:
 a) an acid component a) comprising:
  a1) at least one $C_4$ to $C_6$ polycarboxylic acid or anhydride,
  a2) at least one $C_8$ to $C_{54}$ polycarboxylic acid or anhydride, wherein said polycarboxylic acid a2) is biobased and chosen from the group consisting of azelaic acid ($C_9$), sebacic acid ($C_{10}$), undecanedioic acid, dodecanedioic acid, and respectively $C_{36}$ and $C_{54}$ fatty acid dimers and trimers,
  a3) optionally, at least one $C_2$ to $C_{22}$ saturated monoacid, which can optionally bear a hydroxyl group, wherein the a1/a2 molar ratio ranges from 2 to 8,
 b) an alcohol component b) comprising:
  b1) at least one biobased polyol having a functionality $f_{b1}$ of at least 2, bearing a 1,4:3,6-dianhydrohexitol unit,
  and at least one of the following two polyols b2) and b3):
  b2) at least one polyol different than b1) and having a functionality $f_{b2}$ of at least 2, wherein said polyol b2) is biobased and is chosen from the group consisting of 1,3-propylenediol, 1,2-propylenediol, 1,4-butanediol, and diols derived from saturated fatty acids,
  b3) at least one polyol different than b1) and than b2) having a functionality $f_{b3}$ of at least 3;
 wherein at least 50% by weight of said resin is biobased, the polyester resin having a carboxyl functionality corresponding to an acid number of less than 20 mg KOH/g and an OH functionality corresponding to an OH number ranging from 10 to 200 mg KOH/g.

2. The resin of claim 1, wherein said unit of polyol b1) is isosorbide (1,4:3,6-dianhydro-D-sorbitol), isomannide (1,4:3,6-dianhydro-D-mannitol) or isoidide (1,4:3,6-dianhydro-L-iditol).

3. The resin of claim 1 wherein said component b) comprises b2) and b3) and that at least 50% by weight, of said component b) is biobased.

4. The resin of claim 1 wherein the components a) and b) are 100% biobased.

5. The resin of claim 1 wherein said polyol b3) is biobased and chosen from glycerol and ether-polyol derivatives thereof.

6. The resin of claim 1 wherein said polyacid a1) is a biobased aliphatic diacid chosen from the group consisting of succinic acid, tartaric acid, citric acid, malic acid, itaconic acid, glutaric acid, glutamic acid, fumaric acid, furandicarboxylic acid, tetrahydrofuran-2,5-dicarboxylic acid and tetrahydrofuran-3,5-dicarboxylic acid.

7. The resin of claim 1 wherein said monoacid a3) is present in the composition of said resin and selected from the group consisting of acetic acid, pyruvic acid, lactic acid or rosin (meaning abietic acid and $C_{20}$ isomers), and a $C_{12}$ to $C_{22}$ saturated fatty acid.

8. The resin of claim 1 wherein said polyol b1) represents at least 30% by weight of said resin.

9. The resin of claim 1 having a number-average molecular weight Mn ranging from 500 to 20 000.

10. The resin of claim 1 having a Tg ranging from −10° C. to 100° C.

11. A solution of resin in an organic solvent, comprising at least one resin of claim 1.

12. The solution of claim 11 wherein said solvent is selected from the group consisting of methyl esters and ethyl esters of $C_2$ to $C_4$ monocarboxylic acids, esters of said monocarboxylic acids with methoxy or ethoxy monoethers of $C_2$ to $C_4$ diols, methyl and ethyl diesters of $C_4$ to $C_6$ dicarboxylic acids, terpenes, polyhydroxyalkanoates, methyl and ethyl esters of fatty acid oils, and esters of lactic acid with $C_1$ to $C_8$ alcohols.

13. The composition of claim 12 which is a coating composition in an organic solvent medium which is a paint or varnish composition.

14. A coating composition comprising at least one resin of claim 1.

15. The coating composition of claim 14 which is a crosslinkable composition comprising, in addition to said resin, at least one crosslinking agent, bearing groups which are reactive with the hydroxyl and/or carboxyl groups borne by said resin.

16. The coating composition of claim 14 wherein said crosslinking agent is selected from the group consisting of melamine, polyisocyanate, polyanhydride, and polysilane, when said resin is hydroxylated, or said crosslinking agent is selected from the group consisting of polyepoxides and polyols when said resin is carboxylated.

17. The resin of claim 1, wherein said at least one $C_4$ to $C_6$ polycarboxylic acid or anhydride has a functionality $f_{a1}$ ranging from 2 to 4 and the at least one $C_8$ to $C_{54}$ polycarboxylic acid or anhydride has a functionality $f_{a2}$ ranging from 2 to 4.

18. The resin of claim 1, wherein $f_{a1}=2$, $f_{a2}=2$, $f_{b1}=2$, and $f_{b2}=2$ and $f_{b3}=3$.

* * * * *